United States Patent
Doi

(10) Patent No.: US 7,053,510 B2
(45) Date of Patent: May 30, 2006

(54) ELECTRICAL ACTUATOR

(75) Inventor: Hirofumi Doi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/118,904

(22) Filed: Apr. 10, 2002

(65) Prior Publication Data

US 2003/0071524 A1  Apr. 17, 2003

(30) Foreign Application Priority Data

Oct. 16, 2001  (JP) ............... 2001-318413

(51) Int. Cl.
  *H02K 5/00* (2006.01)
(52) U.S. Cl. .................. 310/89; 310/51; 310/88; 310/64; 310/91; 310/85; 310/86; 310/49 R; 123/198 D; 248/200; 248/300
(58) Field of Classification Search .............. 310/64, 310/156.26, 88, 89, 51, 85, 68 C, 68 B, 68, 310/91, 49 R, 86
See application file for complete search history.

(56) References Cited

U.S. PATENT DOCUMENTS

| | | | | |
|---|---|---|---|---|
| 1,760,988 A | * | 6/1930 | Lansing ................. | 290/48 |
| 3,819,964 A | * | 6/1974 | Noodleman ............. | 310/46 |
| 4,333,026 A | * | 6/1982 | Bock et al. ............ | 310/89 |
| 4,528,473 A | * | 7/1985 | Tezuka ................. | 310/89 |
| 4,529,900 A | * | 7/1985 | Uzuka .................. | 310/43 |
| 4,742,256 A | * | 5/1988 | Tanaka et al. .......... | 310/91 |
| 5,006,744 A | * | 4/1991 | Archer et al. .......... | 310/89 |
| 5,247,216 A | * | 9/1993 | Bosman et al. ......... | 310/91 |
| 5,298,822 A | * | 3/1994 | Bosman et al. ......... | 310/49 R |
| 5,311,090 A | * | 5/1994 | Ferlatte ................ | 310/89 |
| 5,650,676 A | * | 7/1997 | Blumenberg ............ | 310/89 |
| 5,732,565 A | * | 3/1998 | Ramakrishnan et al. .. | 62/298 |
| 5,786,647 A | * | 7/1998 | Vollmer et al. ......... | 310/89 |
| 5,831,357 A | * | 11/1998 | Stohler et al. ......... | 310/64 |
| 5,861,691 A | * | 1/1999 | Soh et al. ............. | 310/64 |
| 5,952,754 A | * | 9/1999 | Mok .................... | 310/91 |
| 6,066,907 A | * | 5/2000 | Matsushima et al. .... | 310/239 |
| 6,120,011 A | * | 9/2000 | Maeno et al. .......... | 267/140.11 |
| 6,215,208 B1 | * | 4/2001 | Kakizawa et al. ....... | 310/89 |
| 6,230,585 B1 | * | 5/2001 | Bator .................. | 74/606 R |
| 6,291,912 B1 | * | 9/2001 | Nadir et al. ........... | 310/89 |
| 6,404,086 B1 | * | 6/2002 | Fukasaku et al. ....... | 310/89 |

(Continued)

FOREIGN PATENT DOCUMENTS

JP  64-8854  *  1/1989

(Continued)

*Primary Examiner*—Darren Schuberg
*Assistant Examiner*—Yahveh Comas
(74) *Attorney, Agent, or Firm*—Sughrue Mion, PLLC

(57) ABSTRACT

An electrical actuator has a DC motor which is provided with a rotor having a permanent magnet for forming a plurality of magnetic poles around a periphery thereof and a stator having a plurality of energizing coils and being disposed around a periphery of the rotor to thereby generate a rotary force for the rotor. In mounting this DC motor on a heat-generating member which generates radiant heat, a member for shielding radiant heat from a heat-generating member is disposed between the DC motor and the heat generating member. In this manner, the radiant heat from the heat-generating member is prevented from reaching the DC motor, whereby the problems in the DC motor associated with the radiant heat can be prevented.

13 Claims, 4 Drawing Sheets

U.S. PATENT DOCUMENTS

| | | | |
|---|---|---|---|
| 6,411,004 B1 * | 6/2002 | Liau | 310/51 |
| 6,426,579 B1 * | 7/2002 | Oda et al. | 310/89 |
| 6,619,527 B1 * | 9/2003 | Moeller | 227/10 |
| 6,674,198 B1 * | 1/2004 | Gubbels | 310/89 |
| 6,755,157 B1 * | 6/2004 | Stevens et al. | 123/41.49 |

FOREIGN PATENT DOCUMENTS

| | | | |
|---|---|---|---|
| JP | 9-261935 | * | 10/1997 |
| JP | 09261935 A | * | 10/1997 |
| WO | WO 9421024 A1 | * | 9/1994 |

* cited by examiner

ELECTRICAL ACTUATOR

BACKGROUND OF THE INVENTION

1. Field of the Invention

The present invention relates to an electrical actuator which is used for controlling a throttle valve, an exhaust gas recirculation valve (EGR valve), supercharging pressure of a supercharger, and the like, which are used, e.g., in a motor vehicle.

2. Description of the Prior Art

Recently, a direct current (DC) motor is used as a driving source for an onboard (in-vehicle) electrical actuator for a motor vehicle. Since the environment in which the DC motor is used is high in temperature and, in view of the heat generation by electric current to flow through coils of the motor, it is obliged to use constituent elements made of a very high heat-resistance material.

However, the DC motors to be used as the driving source for the electrical actuator for various purposes are desirable to be manufactured at a smaller cost in as much a uniform specification as possible. For that purpose, the DC motors are often made of resins, and resins are used in parts requiring strength such as exterior parts and functional parts, e.g., an electrically insulating material for coil materials forming coils, or the like. In order to secure strength or accuracy of each constituent part made of a resin while in service at a high temperature, or from the viewpoint in that the electronic parts for driving the DC motor are sometimes contained inside the motor, due consideration must be taken in most cases to keep the ambient temperature of the DC motor to the lowest extent possible.

Especially, in case the electrical actuator is used for control of supercharging pressure of a supercharger, the electrical actuator is in most cases disposed near an exhaust gas passage or near a turbine of the supercharger which reaches a high temperature due to the heat of the exhaust gas of an engine of a motor vehicle. In such a case, the electrical actuator is used while being exposed to a high temperature as a result of receiving the radiant heat and, therefore, a higher heat resistance of the electric actuator is required as compared to actuators for the other purposes.

Since the conventional electrical actuator is constituted as described above, in case it is used under conditions of a high-temperature atmosphere, there is the following drawback, namely, due to the radiant heat from the heat generating member such as the exhaust gas passage of the engine, the turbine of the supercharger, or the like, the electrical actuator itself is heated to a high temperature, whereby the electromagnetic parts or the electronic parts inside the electrical actuator get out of order. In addition, in order for the electrical actuator to be fixed to the member for supporting it, a constituent part is required. However, the part for supporting the DC motor which serves as the driving source of the electrical actuator has a shape which is uniformly set. Therefore, there is a drawback in that another mounting part other than the DC motor itself must be prepared in order to change the part for mounting the DC motor to the mounted side depending on the purpose and the shape of the mounted side.

SUMMARY OF THE INVENTION

This invention has been made to solve the above-described drawbacks and has an object of providing an electrical actuator in which the radiant heat from the heat-generating member can be shielded so that the problems attributable to the radiant heat can be resolved.

In order to solve the aforementioned drawbacks, the electrical actuator according to this invention comprises a direct-current (DC) motor mounted on a heat-generating member giving off radiant heat, the DC motor comprising: a rotor having a permanent magnet for forming a plurality of magnetic poles around a periphery thereof; and a stator having a plurality of energizing coils and being disposed around a periphery of the rotor to thereby generate a rotary force for the rotator, wherein a heat-shielding means is disposed between the DC motor and the heat-generating member.

The heat-shielding means of the electrical actuator according to this invention is characterized in that the heat-shielding means holds the DC motor and covers at least that side of the DC motor which faces the heat-generating member.

The heat-shielding means of the electrical actuator according to this invention is characterized in that the heat-shielding means forms a thermally insulating space between the heat-shielding means and a periphery of the DC motor.

The heat-shielding means of the electrical actuator according to this invention is characterized in that the heat-shielding means comprises: a motor holding part for mounting and holding the DC motor in position; an attaching part for attaching the DC motor to the heat-generating member; a heat-shielding plate part extending from the attaching part to the periphery of the DC motor for forming a thermally insulating space between the heat-shielding plate part and the DC motor. The motor holding part has formed therein a recessed part for inserting thereinto a boss which is mounted on one axial end of a housing of the DC motor.

The electrical actuator according to this invention is characterized in that a thermally insulating space is formed between an inner circumferential wall of the recessed part and the boss.

DETAILED DESCRIPTION OF THE PREFERRED EMBODIMENTS

An embodiment of the present invention will be described below.

Embodiment 1

Figure 1:
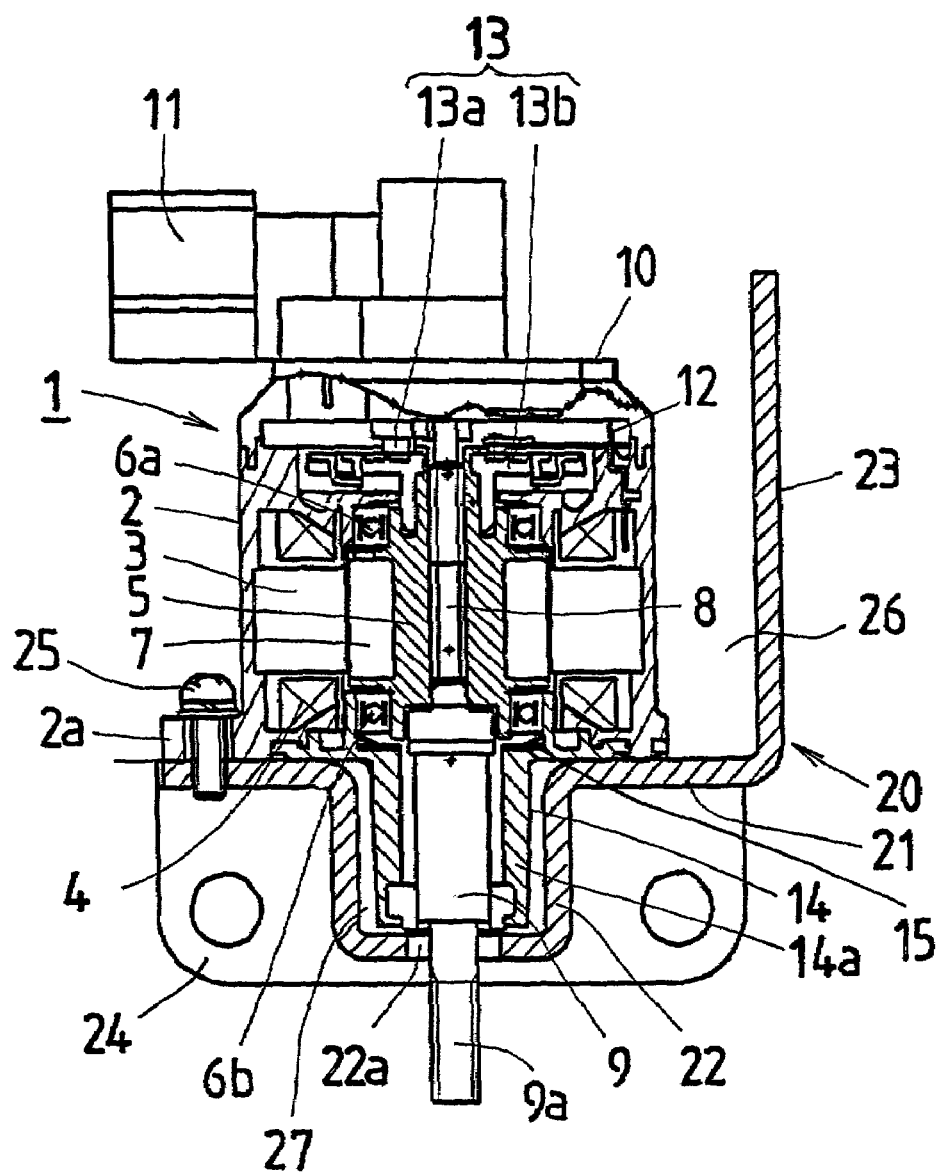
FIG. 1 is a sectional view of an electrical actuator according to an embodiment 1 of this invention.
Figure 2:
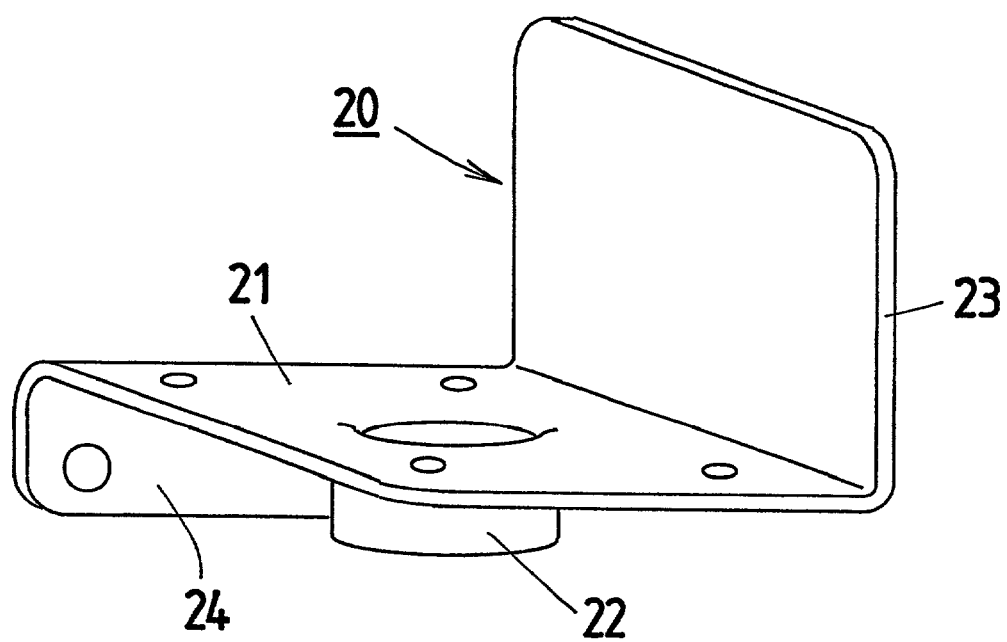
FIG. 2 is a perspective view of a motor holding member in FIG. 1.

FIG. 1 is a sectional view of an electrical actuator according to an embodiment 1 of this invention, and FIG. 2 is a perspective view of a motor holding part which is shown as a portion of the arrangement in FIG. 1.

In the drawing, reference numeral 1 denotes a DC motor which serves as a driving source of an onboard electrical actuator. Reference numeral 2 denotes a housing which serves as an exterior part of the DC motor 1. This housing 2 is formed into a cylindrical shape by a poly-phenylene sulfide (PPS) resin or another resinous material (electrically insulating material) having a higher heat-resistance than the PPS resin. A fixing piece 2a which extends outward is integrally formed on one axial end of the housing 2.

Reference numeral 3 denotes a stator which is disposed on an inner circumference of the housing 2. Reference numeral 4 denote a plurality (three-phases) of coils which are wound around the stator 3. The stator 3 and the coils 4 are molded in resin integrally with the housing 2. Reference numeral 5 denotes a rotor which is disposed by insertion into an axial center of the housing 2. This rotor 5 is made of an electrically insulating material such as a PPS resin or the like, and both axial ends thereof are rotatably supported by bearings 6a, 6b. Reference numeral 7 denotes a permanent magnet which is integrally held on the periphery of the rotor 5. This permanent magnet 7 is made of a ferritic magnet which is integrally fixed by molding through insertion around the periphery of the rotor 5 made of the PPS resin. The permanent magnet 7 may also be of rare-earth magnets. What is essential with this permanent magnet 7 is that anything is acceptable as long as it is integrally formed on the periphery of the rotor 5 so as to form a plurality of magnetic poles on the surface thereof.

Reference numeral 8 denotes a motor shaft through the central portion of the rotor 5 and threadedly engaged therewith. Reference numeral 9 denotes a plunger part which is constituted integral with the motor shaft 8 so as to be axially movable in synchronization with the motor shaft 8. This plunger part 9 functions to operate, in an interlocked manner, as an operated member such as an exhaust gas recirculation (EGR) valve of a vehicle engine exhaust gas system. Reference numeral 10 denotes a casing member which is mounted on one axial end portion (upper end portion) of the housing 2. This casing member 10 is fixed to the housing member 2 by means of plastic deformation, thermal deposition (welding), or the like, in a mounting structure such that the inner hermetic sealing of the DC motor 1 is ensured to thereby prevent the intrusion of water, dust particles, or the like, from outside. Further, the casing member 10 has integrally formed therewith a connector 11 which supplies voltage to the DC motor 1 by connection to an external power source.

Reference numeral 12 denotes a terminal which is electrically connected to the coils 4 and reference numeral 13 denotes a power supply means for applying voltage to the coils 4 through the terminal 12. This power supply means 13 is made up of a brush 13a which is disposed on the side of the casing member 10, and a commutator 13b which is disposed on an axial one end portion (upper end) of the rotor 5 so as to rotate together with the rotor 5. Therefore, the DC motor 1 is a DC motor with a brush.

Reference numeral 14 denotes a boss which is mounted on an axially opposite end (lower end) of the housing 2. This boss 14 is formed in a resin for the purpose of reducing the manufacturing cost and is fixed to the housing 2 by means of plastic deformation, thermal deposition, or the like. The boss 14 has a downwardly projected part 14a which projects downward from the lower end of the housing 2 as seen in a state in which the boss 14 is fixed. The boss 14 forms the exterior part of the DC motor 1 together with the housing 2 and the casing member 10. A rod portion 9a of the plunger part 9 extends downward through the boss 14 toward the driven member (EGR valve).

Reference numeral 15 denotes a pre-loaded spring which urges the lower bearing 6b of the rotor 5 from the lower side upward. This pre-loaded spring 15 is held by the boss 14 between the lower bearing 6b and the boss 14 so as to give an axial preload to the rotor 5 and the lower bearing 6b. The pre-loaded spring 15 serves the function of absorbing an axial clearance between related parts due to variations in axial dimensions of a plurality of parts constituting the rotary portion of the motor, to thereby prevent the rattling between the rotor 5 and the bearings 6a, 6b due to vibrations. Aside from the illustrated plate spring, there may be employed a compression spring; anything will serve the purpose as long as it is an elastic member which urges the lower bearing 6b upward.

Reference numeral 20 denotes a motor holding member for holding the DC motor 1 and mounting them together on an external heat-generating member (not illustrated). In more detail, the motor holding member 20 serves as a heat-shielding means for shielding heat between the heat-generating member such as an engine block of a motor vehicle and the DC motor which is mounted on the heat-generating member. The motor holding member 20 is made up of: a seating plate part 21 which comes into contact with the bottom surface of the housing 2 to serve as a motor holding part for mounting thereon the DC motor 1; a recessed part 22 which is provided in substantially the central portion of the seating plate part 21 for fitting thereinto a downwardly projecting part 14a of the boss 14; a heat-shielding plate part 23 which rises from an outer edge portion of the seating plate part 21 along the housing 2; and an attaching flange 24 for mounting and fixing the DC motor 1 and the motor holding member 20 to the heat-generating member, the attaching flange 24 extending from an outside edge portion of the seating plate part 21 in a direction opposite to that in which the DC motor 1 is inserted and mounted. The bottom portion of the recessed part 22 has an opening 22a for inserting therethrough a plunger rod 9a.

Reference numeral 25 denotes screws which fasten and fix the mounting piece 2a of the housing 2 to the seating plate part 21 of the motor holding member 20. Reference numeral 26 denotes a thermally insulating space which is formed between the housing 2 on the seating plate part 21 and the rising heat-shielding plate part 23 of the motor holding member 20. Reference numeral 27 denotes a thermally insulating space which is formed between the inner circumferential wall surface of the recessed part 22 of the motor holding member 20 and the downwardly projecting part 14a of the boss 14.

As described above, by employing the following arrangement, the DC motor 1 and the motor holding member 20 can be unified in such a manner that the downwardly projecting part 14a of the boss 14 of the DC motor 1 is fitted into the recessed part 22 of the motor holding member 20 to thereby bring the bottom surface of the housing 2 of the DC motor 1 into contact with the seating plate part 21 of the motor holding member 20, and that the fixing piece 2a on the lower end of the housing 2 is screwed with the screws 25 to the seating plate part 21. Further, by mounting and fixing the motor holding member 20 to a heat generating member such as a vehicle engine block or the like which generates radiation heat, the space between the DC motor 1 and the heat-generating member is heat-shielded by the motor holding member 20.

As described above, according to the embodiment 1 of this invention, the DC motor 1 which serves as the driving source of the electrical actuator is mounted and held on the motor holding member 20, and the motor holding member 20 is mounted on the heat-generating member such as the engine block, or the like, of the motor vehicle so that the space between the heat-generating member and the DC motor 1 is heat-shielded by the motor holding member 20.

Therefore, the brush 13a of the power supply means 13, for example, is prevented from prematurely wearing under the thermal influence of the radiant heat from the heat-generating member, thereby expecting the prolongation of the operating time of the DC motor.

Further, if the housing 2 and boss 14 should disengage with each other, the boss 14 remains to be fitted and held inside the recessed part 22 of the motor holding member 20. Therefore, the boss 14 will never get out of position from the housing 2. Still furthermore, there is formed the thermally insulating space 26, 27 between the housing 2 and the rising heat-shielding plate part 23 of the motor holding member 20 as well as between the downwardly projecting part 14a of the boss 14 and the inner circumferential surface of the recessed part 22 of the motor holding member 20, respectively. Therefore, there is an effect in that the radiant heat from the heat-generating member can be more efficiently shielded. Still furthermore, the single motor holding member 20 performs the functions of holding the DC motor 1, mounting and fixing the DC motor 1 to the heat-generating member, and shielding the radiant heat from the heat-generating member.

Furthermore, it is possible to change the shape of the motor holding member 20 depending on the external shape of the DC motor 1. Therefore, by changing the shape of the motor holding member 20, the motor holding member 20 is able to cope with the shape of the DC motor without changing the shape of the DC motor 1 itself depending on the application of the DC motor. The shape of the motor holding member 20 is determined depending on the position and orientation in which the DC motor 1 is mounted. As a result, there is an effect in that the motor holding member 20 is usable as a common part for another DC motor 1 with a different shape.

Embodiment 2

Figure 3:
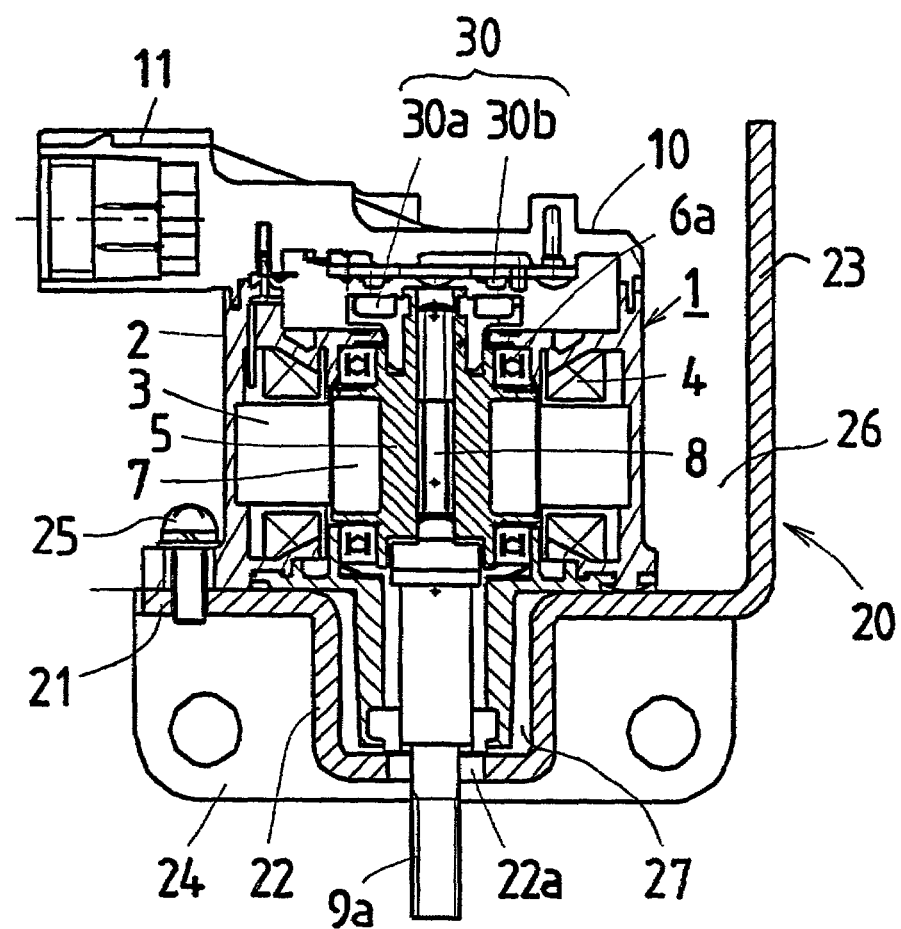
FIG. 3 is a sectional view of an electrical actuator according to an embodiment 2 of this invention.

FIG. 3 is a sectional view showing an electrical actuator according to an embodiment 2 of this invention. The same reference numerals as those of FIGS. 1 and 2 have been attached to the same or corresponding parts and duplicated descriptions thereof have been omitted. In the above-described embodiment 1, the DC motor with a brush is employed as the driving source of the electrical actuator. In the embodiment 2, on the other hand, a brushless DC motor 1 is employed as the driving source of the electrical actuator.

In FIG. 3, reference numeral 30 denotes a position detecting means for detecting the rotary position of the rotor 5. This position detecting means 30 is made up of: a magnet 30a which is disposed on one axial end of the rotor 5; and a Hall-effect device 30b which is disposed on a circuit board in the casing member 10. By means of an ON-OFF signal to be issued by the Hall-effect device 30b due to the change in the magnetic force of the magnet 30a, the magnetism is detected to thereby detect the rotary position of the rotor 5.

The heat resistance of the Hall-effect device 30b as well as of the resin used in each part of the DC motor 1 must now be taken into consideration. Also in the embodiment 2, a motor holding member 20 similar to the one used in the embodiment 1 is used. Since the surrounding of the brushless DC motor 1 is covered by the motor holding member 20, the heat from outside to the brushless DC motor 1 is thus shielded by the motor holding member 20. In this manner, the heat resistance of the Hall-effect device 30b can be improved and the similar effect as the embodiment 1 can also be obtained. The position detecting means 30 may be other than magnetic detecting means by use of the magnet 30a and the Hall-effect device 30b; any detecting means may be employed as long as it meets the function and performance required in the electrical actuator.

Embodiment 3

Figure 4:
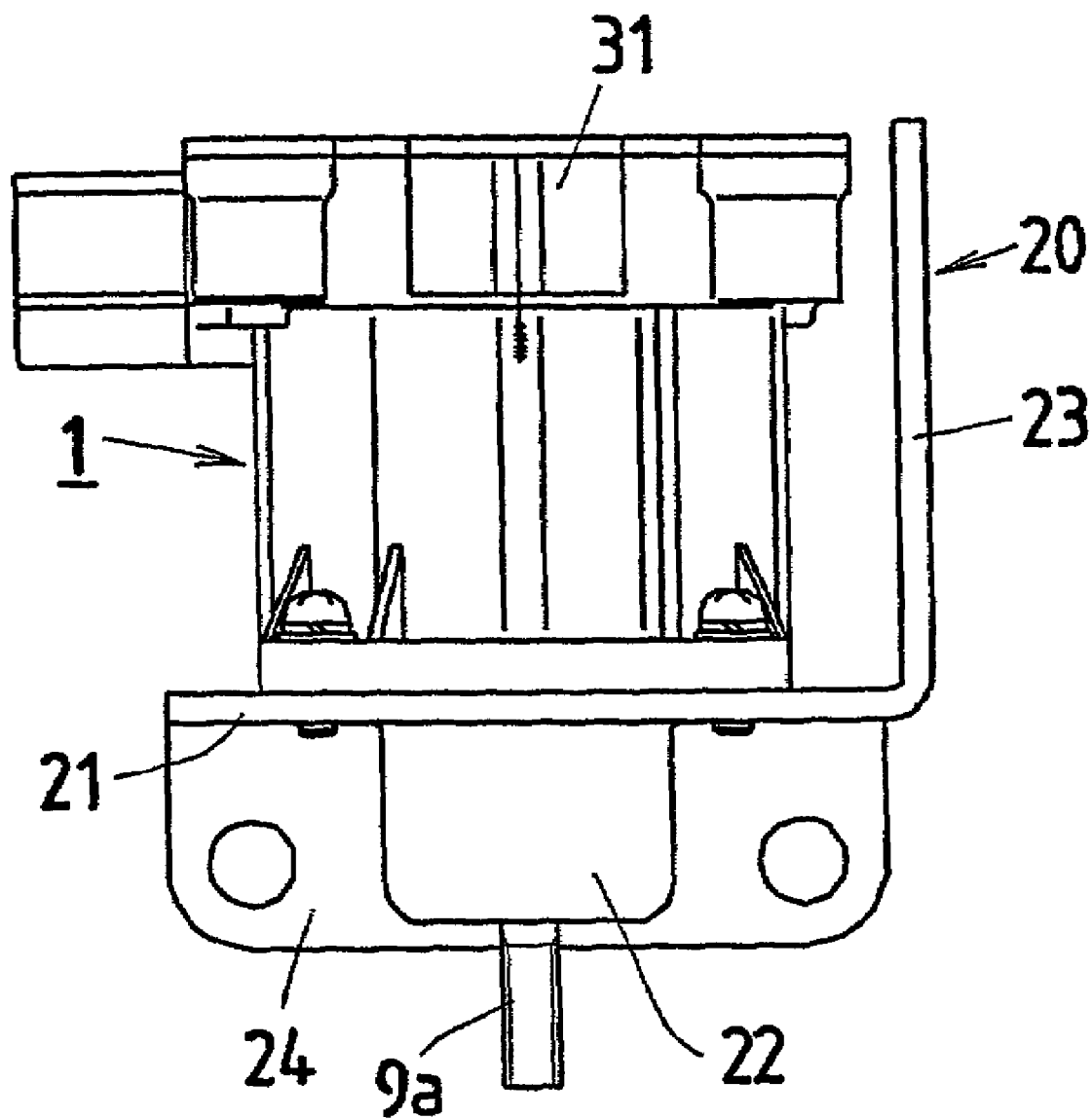
FIG. 4 is a side view of an electrical actuator according to an embodiment 3 of this invention.

FIG. 4 is a sectional view showing an electrical actuator according to an embodiment 3 of this invention. The same reference numerals as those of FIG. 3 have been attached to the same or corresponding parts and duplicated descriptions thereof have been omitted.

In the drawing, reference numeral 31 denotes a control circuit which electrically performs the switching on and off of the power supply required to operate the brushless DC motor 1. The heat resistance is a big issue also in case of this control circuit 31.

As a solution, in the embodiment 3, a motor holding member 20 similar to those in the embodiments 1 and 2 is applied to the brushless DC motor 1 so that the surrounding of the brushless DC motor 1 is covered by the motor holding member 20. According to this arrangement, the heat resistance of the control circuit 31 can be improved as well as the embodiment 1.

Embodiment 4

In the above-described embodiments 1 through 3, the rising heat-shielding plate part 23 of the motor holding member 20 is arranged to partly cover the surrounding of the housing 2 as illustrated. However, the heat-shielding plate part 23 may also be of a shape to cover the entire surrounding of the housing 2. In this arrangement, the heat-shielding effect can further be improved.

As described above, according to this invention, in an electrical actuator comprising a DC motor mounted on a heat-generating member giving off radiant heat, the DC motor comprises: a rotor having a permanent magnet for forming a plurality of magnetic poles around a periphery thereof; and a stator having a plurality of energizing coils and being disposed around a periphery of the rotor to thereby generate a rotary force for the rotator; wherein a heat-shielding means is disposed between the DC motor and the heat-generating member. Therefore, the DC motor is prevented from reaching a high temperature by the radiant heat from the heat-generating member, thereby attaining an effect in that the lowering in function and performance of the DC motor due to the radiant heat is prevented.

According to this invention, the heat-shielding means holds the DC motor and covers at least that side of the DC motor which faces the heat-generating member. Therefore, the DC motor is prevented from reaching a high temperature by the radiant heat from the heat-generating member, thereby attaining an effect in that the lowering in function and performance of the DC motor due to the radiant heat is prevented.

According to this invention, the heat-shielding means forms a thermally insulating space between the heat-shielding means and the periphery of the DC motor. Therefore, there is an effect in that the radiant heat from the heat-generating member toward the DC motor can more efficiently be shielded.

According to this invention, the heat-shielding means comprises: a motor holding part for mounting and holding the DC motor; an attaching part for attaching the DC motor to the heat-generating member; a heat-shielding plate part extending from the mounting part to the periphery of the DC motor for forming a thermally insulating space between the heat-shielding plate part and the DC motor. The motor holding part has formed therein a recessed part for inserting thereinto a boss which is mounted on one axial end of a housing of the DC motor. Therefore, the function of holding and mounting the DC motor to the heat-generating member, as well as the function of shielding the radiant heat from the heat-generating member toward the DC motor can be attained by a single heat-shielding means. Even if the boss gets out of position from the housing, the boss is retained inside the recessed part, whereby it is prevented from getting out of position from the housing.

According to this invention, a thermally insulating space is formed between an inner circumferential wall of the recessed part and the boss. Therefore, there is an effect in that the radiant heat from the heat-generating member is prevented from reaching the side of the boss of the DC motor.

It is readily apparent that the above-described electrical actuator meets all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. An electrical actuator having a DC motor mounted on a heat-generating member giving off radiant heat, said DC motor comprising:
    a rotor having a permanent magnet for forming a plurality of magnetic poles around a periphery thereof; and
    a stator having a plurality of energizing coils and being disposed around a periphery of said rotor to thereby generate a rotary force to said rotor,
    wherein a heat-shielding means for shielding said electrical actuator from said radiant heat is disposed between said DC motor and said heat-generating member, the heat-shielding means includes a seating portion that is coupled to the motor, and a heat shielding wall that extends from a periphery of the seating portion so as to shield the DC motor from the radiant heat, the heat shielding wall being positioned away from the DC motor to provide an open space extending from an area outside said heat-shielding means to an area between the DC motor and said heat-shielding wall,
    wherein said heat shielding wall extends along said DC motor and terminates at a position distal to said seating portion, to provide said heat shielding wall with a free end.

2. The electrical actuator according to claim 1, wherein said heat-shielding means holds said DC motor and covers at least a side of said DC motor to be mounted to said heat-generating member.

3. The electrical actuator according to claim 1, wherein said opening forms a thermally insulating space between said heat-shielding means and a periphery of said DC motor.

4. The electrical actuator according to claim 1, wherein said seating portion forms a motor holding part for mounting and holding said DC motor in position;
    an attaching part for attaching said DC motor to the heat-generating member extends from said motor holding part; and
    said motor holding part has formed therein a recessed part for inserting thereinto a boss which is mounted on one axial end of a housing of said DC motor.

5. The electrical actuator according to claim 4, wherein a thermally insulating space is formed between an inner circumferential wall of said recessed part and said boss.

6. The electrical actuator of claim 5, wherein said thermally insulating space is an atmospheric space.

7. The electrical actuator of claim 3, wherein said thermally insulating space is an atmospheric space.

8. The electrical actuator according to claim 1, further comprising:
    a housing which encases said rotor and said stator,
    wherein said heat-shielding means has a flange portion which is not in contact with said housing and which mounts to said heat-generating member.

9. The electrical actuator according to claim 1, further including:
    a housing which encases said rotor and said stator,
    wherein said heat-shielding means is disposed around less than a full outer periphery of said housing.

10. An electrical actuator having a DC motor mounted on a heat-generating member giving off radiant heat, said DC motor comprising:
    a rotor having a permanent magnet for forming a plurality of magnetic poles around a periphery thereof;
    a stator having a plurality of energizing coils and being disposed around a periphery of said rotor to thereby generate a rotary force to said rotor; and
    a heat-shielding member for shielding said electrical actuator from said radiant heat disposed between said DC motor and said heat-generating member, the heat-shielding member including a seating portion that is coupled to the motor, and a heat shielding wall that extends from a periphery of the seating portion,
    wherein said heat-shielding wall shields the DC motor from the radiant heat and is positioned away from the DC motor to provide an open space from an area outside said heat-shielding member to an area between the DC motor and said heat-shielding wall,
    wherein said heat-shielding wall extends along said DC motor and terminates at a position distal to said seating portion to provide said heat-shielding wall with a free end.

11. The electrical actuator according to claim 10, further including:
    a housing which encases said rotor and said stator,
    wherein said heat-shielding member is disposed around less than a full outer periphery of the housing.

12. The electrical actuator according to claim 1, wherein said heat-shielding wall is flat.

13. The electrical actuator according to claim 10, wherein said heat-shielding wall is flat.

* * * * *